H. Flad,
Water Filter,

№ 62,538. Patented Mar. 5, 1867.

Witnesses:
Geo. P. Herthel Jr.
Chas. H. Boyle.

Inventor:
Henry Flad
by M. Randolph & Batty

United States Patent Office.

HENRY FLAD, OF ST. LOUIS, MISSOURI.

Letters Patent No. 62,538, dated March 5, 1867.

---

IMPROVEMENT IN FILTERS.

---

The Schedule referred to in these Letters Patent and making part of the same.

---

TO ALL WHOM IT MAY CONCERN:

Be it known that I, HENRY FLAD, of the city and county of St. Louis, State of Missouri, have invented a new and useful Self-Cleaning Filter; and I do hereby declare that the following is a full and exact description of the same, and the operation thereof, reference being had to the accompanying drawings, and the letters of reference marked thereon. Of said drawings—

Figure 1:
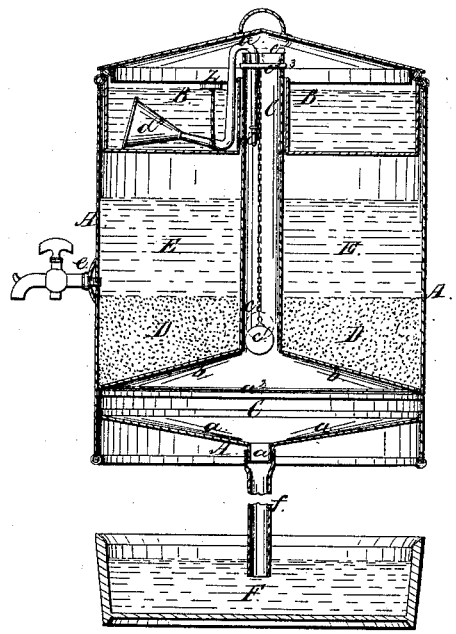
Figure 2:
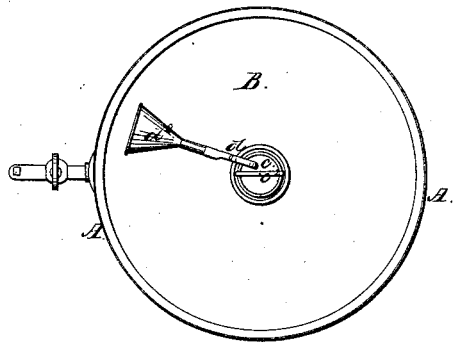

Figure 1 is a central sectional elevation, showing the internal arrangement of my said filter; and Figure 2 is a top plan, showing the feed-water reservoir.

The general nature of my invention is the arrangement of a filter for cleansing and purifying fluids, especially water, from sediments or other impurities, so as to fit said fluids for domestic and manufacturing uses. It is my experience that, the area and height of stratum of the filtering substance being assumed constant, the volume of liquid which can be properly purified by filtration is thereby determined. Moreover, a variation from the proper volume of liquid flowing to such filtering stratum will usually cause an improper and imperfect filtration. It is, therefore, necessary to keep the feed-flow to the filter invariable in volume, and invariable in height of fall or head. Now, if said feed-flow be received from a reservoir, the level of liquid in said reservoir will usually lower in proportion to volumes drawn off, thus varying the head of the feed-flow, and the pressure and velocity thereof. If the feed-flow be, however, taken from the pipes of a city water-works system, the pressure and velocity of this flow will vary with the pressure and velocity of the water in the pipes, thereby again causing an improper filtration. In consideration hereof the nature of my invention consists in certain self-adjusting equalizers of said feed-flow to the filtering stratum, which, at all times, insures a proper filtration. It is, furthermore, in the filter now commonly in use, an operation of much difficulty and inconvenience to cleanse the filtering stratum of the impurities and sediments which it has taken from the filtered fluid. The nature of my invention consists, in view hereof, of an improved cleansing process, which, in its general features, consists as follows: After the feed-flow has been checked, and a proper volume of filtered fluid is accumulated over the filtering stratum, open a discharge pipe connecting with a receiver placed at some distance below the level of the filter. The filtered fluid will then reverse its flow, and pass (owing to the head caused by its height above the said receiver) with great velocity through the filtering stratum, thereby sweeping the impurities and sediments out of said stratum and into said receiver. All of said manipulations here required in cleansing being simple, and not demanding skill or intricate labor, the same can, therefore, be fully performed by any person, however inexperienced.

To enable those skilled in the art to make and use my improved filter, I will now proceed to describe its detail construction and operation.

I construct a suitable vessel, A, of any convenient form and suitable material to receive the inner parts. Usually said vessel will be cylindrical in shape, and of sheet tin or zinc. The bottom $a$ of said vessel A is conoid in form, its surface sloping toward the discharge opening $a^1$. In the usual form of my filter, the vessel A has a shelving projection, $a^2$, above said bottom $a$. Upon the projection $a^2$ I place a conoid perforated diaphragm, $b$. The feed-tube $c$ is secured in the centre of this diaphragm. The check-valve $c^1$ is in this feed-tube $c$. This is a simple ball-valve, the ball being secured by a small chain, so that the valve may be operated from the top of the feed-tube $c$. I would, however, state that any simple form of valve which can be operated from above can be used instead of the ball-valve. In the form shown, the valve is open when the little bar to which the valve-chain is attached ($c^2$) rests on the upper end of the tube $c$. When $c^2$ is put into the notches $c^3$ the valve is closed and the feed-flow checked. At the upper end of the vessel A, I support on the same the feed-reservoir B. This is annular in form, its inner vertical cylindrical wall surrounding the upper end of the feed-tube $c$, and forming around said tube, and in the vessel A, a separate fluid-tight reservoir. The feed-water or fluid is delivered first into the reservoir B; and, as the feed-flow to the filter below takes the fluid slowly out of said reservoir, a portion of the heavier sediment of the fluid will be deposited on the bottom of the reservoir B. This is, therefore, so placed in the vessel A that it may be easily taken out and cleansed. From said reservoir B the feed-flow is drawn through the feed-tube $c$ usually in the manner following: $d$ represents a rubber or other tube, the lower end thereof, $d^1$, passing into the feed-tube $c$. The end $d^1$ is made in such manner that, with the greatest head of water, (that is, when the reservoir is filled to its greatest capacity,) the feed-flow passing the end opening will not be too great for a proper filtration. I would state, by combining with the tube $d$ a float, $z$, in such manner that, when said float rises or falls, the end $d^2$ of said tube rises or falls correspondingly, and a constancy of head of the feed-flow may be maintained. The float $z$, which may of cork, or other suitable material, is attached (as shown in the drawings) to tube $d$, or in such manner affixed thereto as will cause the siphon mouth to remain at a given depth below the surface line B, and by this means equalize the head of water which constitutes the feed-flow. In order to more readily cause the tube $d$ to act as siphon, a funnel, $d^2$, may be used on the upper end of $d$; and, the funnel and tube $d$ simply being filled with the fluid, the funnel then dropped into the reservoir B, the siphon action will be immediately secured. The feed-flow may be drawn from B in many other ways; for instance, by a tube leading to the tube $c$, and having a suitable stop-cock, this stop-cock being operated by a float placed in the reservoir B, the feed-flow may again be regulated as required. Upon the diaphragm $b$ I place any filtering material, such as sand or tiff, in a proper manner. Now, by the feed-flow, the space C, formed between the conoid surfaces $a$ and $b$, is filled with fluid, and this passes upwardly through the stratum of filtering material D, and leaves in said stratum its impurities, so that in the space E, above said stratum D, and below the reservoir B, the purified and clarified fluid gathers. From here the clear liquid is drawn off, as per demand, by and through a stop-cock, $e$.

I do not claim that there is anything novel in the manner of the filtration proper; and I am well aware that the feed-flow has been made to pass under and up through the filter stratum in many filters now in use. Neither is there anything in the arrangement of the parts of the filter stratum itself which is here specially claimed; but I do assert that the improvements which will hereinafter be more specially claimed, as presented herein, can be used in connection and operation with many and various arrangements of feed-flow, and many and various arrangements of filter stratum.

During the progress of the process of filtration the discharge opening $a^1$ remained closed. After the filter has been in use for some time, the filter stratum D will clog with sediment and impurity. In order, then, to cleanse the same, I close the valve $c^1$, checking the feed-flow, open the discharge opening $a^1$, and the filtered fluid, which preparatory hereto has been gathered at E, will flow with great velocity and pressure back through the filter D, and cleanse the same; and the impurities will be swept by the fluid through the space C; and any sediment herein lodged will be carried with the fluid through the discharge passage $a^1$, and by a mud pipe, $f$, into a receiver, F, it being understood that said receiver is placed at a proper distance below the filter D. When the flow of fluid has ceased, the discharge passage $a^1$ being closed, and the valve $c^1$ raised, the operation of filtering may be again successfully accomplished.

It has been before stated that the surface of the bottom $a$ should be inclined downwardly toward the central opening $a^1$. It will be seen that hereby the sweeping and carrying off of any sediment which rests on said surface $a$ is much facilitated. Moreover, the surface $b$ is inclined upwardly, as before specified, for the following reason: During the feed-flow into the space C, bubbles of air will pass into said space, owing to the confining influences of the surrounding fluid. These bubbles attempt to pass through the perforated diaphragm $b$. If the same were horizontal, I have experienced that they do so pass, and thus penetrate the filter stratum D, and stir the same, causing turbidness in the water or fluid above. In order to avoid this, said diaphragm $b$ is arranged as a conoid surface. The air bubbles then roll along the lower surface thereof, and duly pass up the feed-tube $c$. It will usually be well to permit the discharge pipe $f$ to pass below the surface of water, or other fluid, partially filling the receiver F. Then, in the discharge of the cleansing fluids, air is prevented from passing to the space C, and causing inconvenience, as before mentioned. Lastly, I would state that the arrangement of my said filter is well adapted to uses as a refrigerator also; and it has been a matter of especial design to so arrange the parts of my said filter that ice, or other cooling media, may be introduced.

Having thus fully described my said invention, what I claim, and desire to secure by Letters Patent, is—

My improved filtering apparatus, constructed of a removable feed-tube $c$, and inclined or conoidal supporting-plate $b$, a removable feed-reservoir B, and outer enclosing vessel A, combined and operating substantially in the manner herein set forth.

I claim also the combination of a check-valve $c^1$, chain and supporting-bar $c^2$, with the upright feed-tube $c$, of a self-feeding filtering apparatus, constructed and arranged substantially as herein described.

I claim also siphon $d$ and float $z$, in combination with feed-tube $c$, of an improved filtering apparatus, constructed and operating substantially in the manner herein set forth.

HENRY FLAD.

Witnesses:
    GEO. P. HERTHEL, Jr.,
    M. RANDOLPH.